United States Patent [19]
DeLong et al.

[11] Patent Number: 4,966,650
[45] Date of Patent: Oct. 30, 1990

[54] METHOD FOR FRACTIONATION OF LIGNINS FROM STEAM EXPLODED LIGNOCELLULOSICS TO PROVIDE FRACTIONS WITH DIFFERENT PROPERTIES

[76] Inventors: Edward A. DeLong, 439-22560 Wye Road, Sherwood Park, Alberta, Canada, T8A 4T6; George S. Ritchie, 2428 Westview Village, Winterburn, Alb., Canada, T0E 2N0

[21] Appl. No.: 246,069

[22] Filed: Sep. 19, 1988

[30] Foreign Application Priority Data

Sep. 17, 1987 [CA] Canada .................................. 547109

[51] Int. Cl.$^5$ .................. D21B 1/36; D21C 3/18; D21C 3/20; D21C 3/26
[52] U.S. Cl. ........................................ 162/14; 162/16; 162/21; 162/60; 162/72; 162/77; 162/88; 162/89; 530/500; 530/507
[58] Field of Search ................. 162/21, 22, 72, 77, 162/14, 90, 16, 60, 74, 76, 87, 88, 89, 75; 530/500, 507; 127/1, 37; 426/447, 449, 635, 636, 426, 431, 439

[56] References Cited

U.S. PATENT DOCUMENTS 2,752,394  6/1956  Sorensen ................................. 162/16
4,453,004  6/1984  Nelson .................................. 562/473
4,470,851  9/1984  Pazner et al. ........................ 162/16

FOREIGN PATENT DOCUMENTS 2000822  1/1979  United Kingdom ................... 162/21

*Primary Examiner*—Steve Alvo
*Attorney, Agent, or Firm*—Griffin Branigan & Butler

[57] ABSTRACT

The chemical components of lignocellulosic material which have been dissociated by a steam explosion process can be extracted from the mixture of components using a solvent extraction process. The solvents are water, alcohol and a mild caustic in that order, or the alcohol step can be by-passed and only water and caustic are used. The caustic is a stronger solvent and it will extract the alcohol solubles along with the caustic only solubles. The eluant from the these extractions contains a range of lignin derived substances, which have different applications, such as thermoplastic and thermosetting characteristics. This invention describes a method for partitioning these lignin components into reproducible fractions having definable characteristics for particular applications. For instance, many copolymer applications require a thermosetting only fraction of the lignin. Other applications require a thermoplastic only lignin. The patent also describes a process for converting the thermoplastic lignin fraction to thermosetting lignin.

15 Claims, 2 Drawing Sheets

METHOD FOR FRACTIONATION OF LIGNINS FROM STEAM EXPLODED LIGNOCELLULOSICS TO PROVIDE FRACTIONS WITH DIFFERENT PROPERTIES

CROSS-REFERENCE TO RELATED APPLICATIONS

A key requirement in the application of this patent is the prior use of the Steam Explosion Process as outlined in Canadian Patents No. 1,217,765 or 1,141,376 entitled "A Method for Rendering Lignin Separable from Cellulose and Hemicellulose in Lignocellulosic Material and the Product so Produced" or competing versions thereof. A patent application related to this topic is entitled "A Method for Extracting the Dissociated Chemical Components of Steam Exploded Lignocellulosic Materials, Their Partitioning into Discrete Substances or Classes, Followed by Bleaching of the Residual Cellulose".

FIELD OF THE INVENTION

This invention relates to the isolation of reproducible Lignin fractions from dissociated lignocellulosics obtained by a Steam Explosion Process, and their purification. In particular, the Lignin fractions are partitioned by solubility in selected solvents in order to provide lignins with different but reproducible properties for particular applications. For instance, many copolymer applications require a thermosetting only fraction of the lignin. As used herein, "thermosetting lignin" means lignin which can be thermally set initially, but not thermally re-set thereafter. Other applications require a thermoplastic only lignin. As used herein, "thermoplastic lignin" means lignin which can be thermally set and thermally re-set thereafter. In other applications the presence of vegetable oil could be either an advantage or a disadvantage. This invention describes methods for separating the dissociated lignin into consistently reproducible products tailored for particular end use applications.

BACKGROUND OF THE INVENTION

Lignin is the second most abundant organic chemical after Cellulose. It is associated with hemicellulose in both woody and fibrous plants, as the adhesive which holds the bundles of Cellulose fibrils together. It is found in the primary wall, the middle lamella and within the fibre bundle or core. FIG. 3 is a representation of a lignocellulosic fibre where the dotted area 46 is called the Middle Lamella. The Middle Lamella 46 is the glue which holds adjacent fibres together. It contains crosslinked lignin and xylan in a ratio of about 70 to 30. The Primary Wall 48 is the outer casing around the fibre core much like the casing on an underground telephone cable. It contains crosslinked lignin and xylan in about equal quantities with a small amount of cellulose to provide structural strength. The fibre bundle or core 50, 51 and 52 consists of closely bound cellulose fibrils. Each fibril is bound to the adjacent fibrils by a further coating of crosslinked lignin and xylan. The ratio of lignin to xylan in the fibre core is 30 to 70, but because of its large volume relative to the Middle Lamella and Primary Wall, 70 percent of the lignin is found in the fibre bundle. The fibrils in the fibre bundle form a slight spiral along the direction of the fibre and each fibril is hinged by an amorphous area about every 300 glucose molecules in the fibril. It is this hinge which is the weakest area in the fibril and is the point where fibrils are converted to microfibrils by the Explosion Process when operated at or above 234 degrees centigrade according to the teachings of Canadian Patent 1,217,765. Finally, the lumen 54 is a hollow area in the middle of the fibre bundle where liquids migrate through the lignocellulosic composite to provide nourishment to the plant.

The overall description of how Lignin is generated in vivo can be briefly summarized as an oxidative coupling of monolignols. Three types of starting materials are used in different proportions depending upon the plant type: coniferyl alcohol, syringyl alcohol, and to some extent, p-coumaryl alcohol. Each of these three unsaturated alcohols has four or more reactive sites, by which they may undergo coupling. As the Lignin polymer grows larger, the number of permutations for coupling increases rapidly. Furthermore, the chain becomes highly branched and cross-linking between chains occurs. Hemicellulose, in the form of a linear Xylan polymer containing side groups of 4-0-methyl-(alpha)-D-glucuronic acid residues in aspen for example, becomes cross-linked to the Lignin. These Lignin-hemicellulose bonds can be likened to spot welds which soften and become increasingly fragile above the glass transition temperature of the Xylan (165 degrees celcius). Many of the bonds between the lignol fragments are of the benzyl ether type and may be labile to electrophilic cleavage. Other bonds include the resistant carbon-carbon type and biphenyl ethers.

To conceptualize, the model of Lignin in the original lignocellulosic material is that of an infinite gel made up of a cage of Lignin which is swollen with water and has embedded in it, stiff chains of short substituted xylans (DP approx. 100–200) spot welded to the Lignin. This material acts as an adhesive to bind the macromolecular Cellulose chains together for structural purposes.

SUMMARY OF THE INVENTION

The apparatus to implement this process is shown in FIG. 1, where 1 is a pressure vessel having a valved outlet 2 at the base and a loading valve 3 at the top. 4 is the steam input valve. 5 & 6 are thermocouples designed to measure the temperature of the material in the pressure vessel. 9 is a thermocouple in the steam input line to measure the temperature of the input steam. 10 is a pressure gauge to measure the input steam pressure. 7 is a condensate trap to hold water condensate which is produced during the heating cycle of the material, when the hot steam is admixed with the much colder input lignocellulosic material. As the material draws heat from the steam, the condensate runs to the bottom of the digester and into the condensate trap 7. 8 is an optional die which can provide various orifice constrictions to provide more or less abrasion during explosive decompression dependent of the end application of the processed material. 11 is mechanically divided input lignocellulosic feedstock.

In brief, the Steam Explosion Process brings the whole lignocellulosic material to a softened state (at the glass transition temperature of the Cellulose) by heating the material to 234 degrees celcius, at which point it is explosively decompressed through an orifice. The tremendous shearing forces present during the explosion, degrade the macromolecules into smaller units, mechanically. Cellulose is fractured at its amorphous hinges, which are the weakest links in the Cellulose chain. This results in Cellulose at a DP in the range of 220 to 300. The crosslinks between the hemicellulose and the Lignin are fractured and the Lignin becomes carbohydrate free. The Lignin itself is extensively, but randomly depolymerized. Polymer theory indicates that non linear polymers, on random degradation produce polydisperse molecules. That is, even if the Lignin polymer was a regular, branched polymer, this degradation would result in a large range of molecular weights. Since Lignin is so irregular, the polydispersity is one of very complex materials. In fact, its molecular weight ranges from monolignols to complexes of more than one million daltons. Finally, the rapid thermal quenching of the reaction at the end of the explosion, (the steam temperature falls instantly due to adiabatic expansion from 234 degrees celcius to below 100 degrees celcius), prevents the more reactive components of the lignins from reforming into larger Lignin molecules by re-cross-linking.

In conventional pulping systems, chemical reagents are used to remove the Lignin, usually caustic with sulfur dioxide (sulfite process) or with sodium sulfide (alkaline or Kraft process). The sulfur acts as a nucleophile on the benzyl ether linkages, with cleavage of the Lignin into smaller molecules and with concomitant insertion of sulfur into the Lignin. The hemicellulose linkages are often left intact. Conventional lignins are therefore equally polydisperse, but they contain sulfur not present in the original material, and they usually contain variable amounts of carbohydrate. Chemical methods of degradation are very susceptible to process parameters. The chemical properties of conventional Lignin preparations are prone to change from batch to batch, making quality control difficult. The major problem of conventional lignins is the lack of reproducibility and their positive sulfur content. The latter is harmful if the Lignin is to be burnt as a fuel due to sulfur-containing emissions, and the presence of sulfur groups reduces the reactivity of sulphonated lignins. Explosion Process lignins are unique.

After the Explosion Process the lignins contained in the dissociated mixture of chemical components of the starting lignocellulosic material are very pure and reactive. Their methoxyl content is about 19% as compared to a theoretical content of 21% in 100% native lignin. Their ash content is only 1.5% and even this is partly mineral residue from the water used in fractionation. They are highly reactive because of the near instant thermal quenching, which occurs immediately following their dissociation during the explosion and, they are obtained in high yield, in pure form, sulfur-free and are generally low enough in molecular weight to be soluble in simple organic solvents. Even so, for applications requiring reproducibility, the polydispersity factor demands that the Lignin be fractionated and that these fractions be limited in molecular weight range for good quality control, where needed. It is for these process parameters and the product so produced that protection is sought in this important dissociation, extraction and fractionation process.

Lignin obtained from the Steam Explosion processing of lignocellulosics can be divided into 8 fractions. Fraction "A" is water-soluble and is recovered from the water by liquid/liquid extraction with dichloromethane. In this specification, "dichloromethane" is used as a representative of the class of compounds of the type 'halocarbons' (which includes the class of "freons"), as well as other solvents or mixtures thereof which are both water immiscible and low in boiling point, as well as being good solvents for low molecular weight aromatics. Compounds dissolved in the dichloromethane which result from the decomposition of carbohydrates, namely furfural, 5-methylfurfural, 5-hydroxymethylfurfural, and Acetic Acid are removed by distillation or liquid chromatography. The remainder of the dichloromethane solubles (Fraction A) is a mixture of monolignols and related products including vanillin, syringaldehyde, and dilignols. These products can be recovered as pure chemicals by means current to the art such as distillation and commercial chromatography.

FIG. 2 is a sketch of a column, which is used to dissolve and thereby achieve a first stage separation of the various dissociated chemical components of the Explosion Processed lignocellulosic material. The column 1 is a tube open at both ends. The tube can be almost any geometric configuration in cross section from circular to triangular to rectangular and so on. The column 1 is loaded with loosely packed processed lignocellulosic material 6. At the base of the column is a filter 2 which is fine enough to prevent the processed material from passing through, yet course enough to allow dissolved solids laden eluant to flow through as fast as the column of material will permit. The column is mounted on a reducing base 3 to bring the eluant to a neck with a valved outlet 4 to control the flow rate of the column when necessary. Temperature, pH, flow rate and other sensors are mounted in the column base to provide control information to the column Command and Control System. A fine screen 5 is mounted in the top of the column to disperse the input solvent evenly over the material at the top of the column. This prevents undue compression of the material in the column.

Solvents such as water 7, followed by alcohol 8, followed by mild caustic 9 followed by bleach, or any combination of these can then be introduced into the top of the column and their eluants laden with solids, soluble in that particular solvent, will flow through the processed lignocellulosic material in a plug flow fashion and be collected for product recovery from the base of the column as water solubles 11, alcohol solubles 12, caustic solubles 13, and bleach solubles 14 or any combination thereof. The column can be used for various treatments such as acid or alcohol impregnation where uniform treatment of the residual material is desired.

In one embodiment of this specification, after the dissociated lignocellulosic material has been water extracted in a column, alcohol (one of the series methanol, ethanol, propanol, isopropanol), is added to the top of the same column and allowed to drain through the material. The alcohol is at ambient temperature usually, but it may be warmed to increase flow rates in the column. When alcohol is percolated in a plug flow manner down through the water laden lignocellulosic residue, some mixing occurs at the water/alcohol interface. This mixing causes a water/alcohol mixture gradient to occur. At about 20% water the alcohol is a more efficient solvent than either near dry alcohol or alcohol with more than 20% water in the water/alcohol mixture. Thus lignin components which are not soluble in near dry alcohol are eluted at the bottom of the column as a near first out eluant. The lignin extracted by this alcohol extraction (lignin "B") contains a combination of residual lignin "A" (Vanillin and Syringaldehyde), lignin "C" (Vegetable oil, and Plant Steroids), lignin "D" (thermoplastic lignin) and lignin "E" (thermosetting lignin). The wet alcohol eluant is collected at the bottom. Water is then added to precipitate this Fraction "B" Lignin from the alcohol/water eluant. Alternatively, the alcohol/water eluant can be heated to distill off the alcohol preferably under vacuum to prevent modification of the lignin and thereby precipitate the Fraction "B" Lignin. Salt is added (typically sodium chloride or calcium chloride, but others may be used as well) to make a 0.2–2% brine. This causes the Fraction "B" Lignin to flocculate and form large particles which can be filtered readily. Once collected by filtration the product may be air dried or vacuum dried. An increased yield of vanillin is obtained if the brine solution or the water/lignin mixture is sent to the liquid-liquid extractor containing dichloromethane for recovery of the organics in the brine or water/lignin mixture. Reverse osmosis can also be used to separate the Lignin from the water/alcohol eluant and the filtrate can be liquid/liquid extracted with dichloromethane to increase the yield of vanillin. Various combinations of the above are possible dependent on end product requirements.

Fraction "C" is soluble in a paraffinic solvent, typically one of the group pentane, hexane, heptane, petroleum ether 30–60 and petroleum ether 60–80, as well as dichloromethane and alcohols. This fraction contains mainly non-Lignin related materials such as vegetable oil and plant steroids. In aspen, for example, this vegetable oil resembles linseed oil in its chemical characteristics, due to the presence of glycerides of linoleic acid as its major component. The nature of the vegetable oil will depend upon the species of lignocellulosic material used as feedstock in the Steam Explosion Process. Lignin "C" also contains highly colored substances, as yet undefined, some of which may be Lignin related. They are low in molecular weight (typically 600 daltons).

Fraction "D" is soluble in dichloromethane, mild caustic and alcohol, but is insoluble in paraffinic solvents. This fraction contains pure, thermoplastic Lignin. It has a melting point range of 130–140 degrees celcius, and a number average molecular weight of 800–1000 daltons.

Fraction "E" is soluble in an 80/20 alcohol/water mixture and aqueous caustic, but insoluble in paraffinic solvents and dichloromethane, and only partially soluble in dry alcohol. It is collected as a fine powder by precipitating the alcohol/lignin solution in dilute brine. The salt is added to promote flocculation. Alternatively, heat (typically 40–80 degrees celcius) may be applied to achieve similar results. This fraction contains pure thermosetting Lignin, having a melting point range of 170–180 degrees celcius, and a number average molecular weight of 1500–2000 daltons. It is an ideal co-polymer for thermosetting plastic and resin applications.

Fraction "F" is soluble in aqueous caustic only and is a very high molecular weight product. This is termed a "pseudolignin". It does not melt below 250 degrees celcius but sinters or chars. It is believed to contain Lignin which has been modified by crosslinking with furfural from degraded pentoses during the heating cycle of the Steam Explosion Process.

Fraction "G" is obtained by extracting the water extracted residue with a mild, less than two percent, caustic solvent selected from the group of sodium hydroxide, ammonium hydroxide and potassium hydroxide, and acidifying to pH 3–4. Fraction "G" is the same as Fraction "B" lignin except that it contains the Fraction "F" lignin in addition to fractions "A" "C" "D" and "E"

Fraction "H" is the same as Fraction "G" except that it contains no fraction "D" lignin. Fraction "H" is obtained by acidifying the caustic solution and gel to pH 3 to pH 4. The mixture is then heated to a temperature between 40 and 80 degrees celcius. At this temperature the gel breaks down into a particulate precipitate and the thermoplastic lignin "D" is converted to thermosetting lignin "E".

Upward transformations in molecular weight can be achieved by manipulation of the Explosion stage of the process parameters as well as post dissociation treatment with acid. Yields of the above fractions can also be manipulated by varying the parameters of the Explosion Process. Canadian Pat. No. 1,141,376 is but one example of this phenomenon.

DESCRIPTION OF THE PREFERRED EMBODIMENTS

Figure 1:
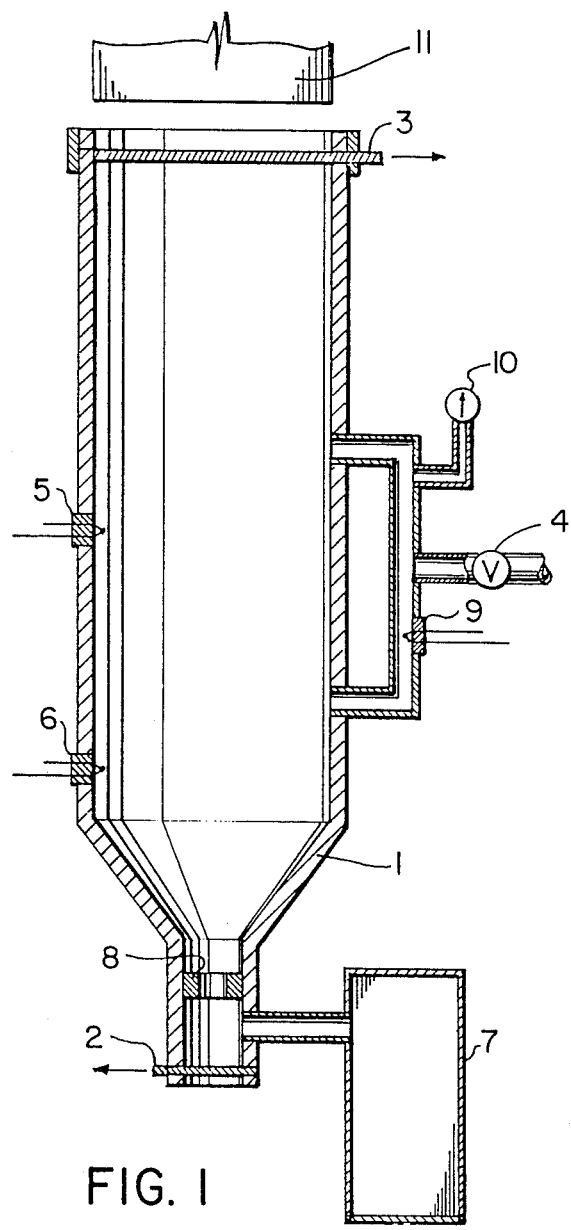
Figure 2:
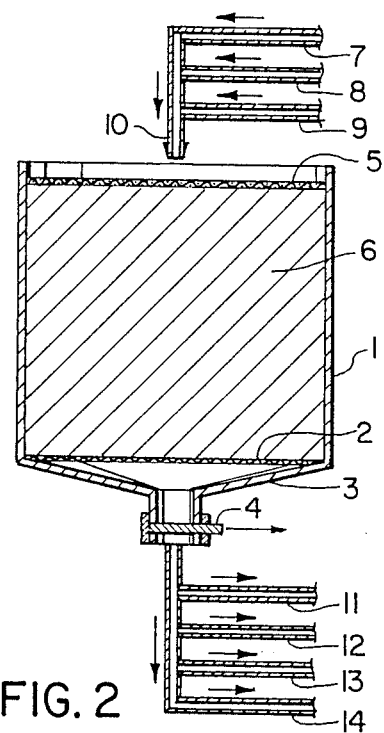
Figure 3:
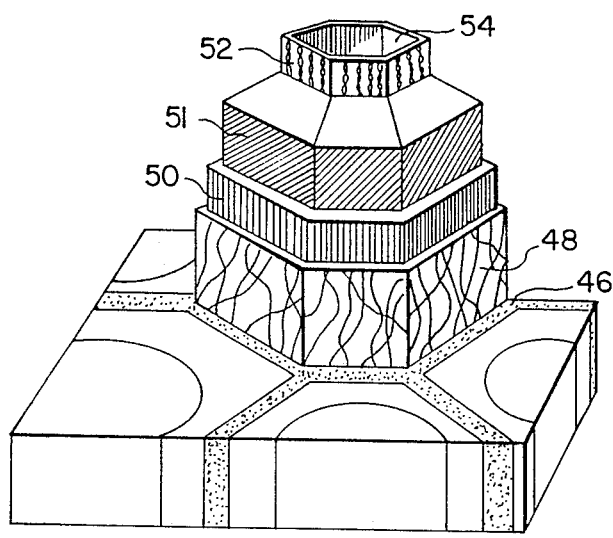

The Lignin in the lignocellulosic material is first dissociated from the hemicellulose by the Stream Explosion Process as outlined in Canadian Pat. Nos. 1,217,765 and 1,141,376. This freshly exploded, moist material is transferred to an extractor column (See FIG. 2), which has an upper opening through which solvent can be added and a lower opening for the removal of the eluant. In this specification, "eluant" means a solvent, with its dissolved or suspended materials, which is removed from the columns. The column can be a cylinder or any other reasonable cross-sectional geometry (square or rectangular for example), open at the top and having a drainage system for recovering the eluants at the bottom. Typical depths of dissociated lignocellulosic material range from one foot to twenty feet, but a two to five foot depth is preferred. No packing or agitation of any type is to be applied to the column contents at any time.

Water is added to the top of the extractor column and allowed to drain through the dissociated material. In a typical five foot column, two column volumes are sufficient to displace all but 1% of the water soluble components of the material. For single extraction column operations, the whole aqueous eluant, after removal of the protein to prevent rag, is sent to a liquid-liquid extractor containing Dichloromethane to remove the water-soluble Lignin components (Fraction A). Water exiting the liquid-liquid extractor is heated to 50 degrees celcius to distill off the small amount of Dichloromethane which is dissolved in the water. The Dichloromethane vapours are recondensed and sent via a return line to the liquid-liquid extractor. Lignin fraction "A" is obtained by distillation at 50 degrees Celsius to remove the Dichloromethane. Fractional distillation at 80 degrees celcius removes the Acetic Acid, and under slight vacuum at the same temperature, the furfural, 5-methylfurfural, and 5-hydroxymethylfurfural (if any) are removed. The residue contains the monolignols, dilignols, vanillin and syringaldehyde which are recovered by commercial chromatography or hard vacuum distillation of a combination thereof to give pure, discrete chemicals.

For large scale operations, more than one extraction column is practical. In this case, only the first twenty percent or so of the water soluble fraction, after protein removal, is sent to the liquid-liquid extractor, the remainder of the eluant is used to wash a portion of the subsequent lignocellulosic extraction column in series. All other parameters remain the same. Conventional pulp washers and filter systems or other liquid/solid solvent extraction systems can be used to make these extractions but the column technology is significantly more efficient.

At the completion of the water extraction stage, the remaining material is extracted using an alcohol selected from the group ethanol, methanol and isopropanol. This extraction stage can be done by conventional wash and filter processes or preferably the alcohol extraction is accomplished by placing the alcohol in the column on top of the water extracted material and collecting the alcohol soluble fraction "B" eluant from the bottom of the column (See FIG. 2). The main component of this alcohol soluble fraction "B" is a thermoplastic Lignin, fraction "D", but it also contains some high molecular weight thermosetting Lignin, fraction "E" which is soluble in molten thermoplastic lignin (fraction "D"), thereby increasing the melting point range of the combination above that of fraction "D". Fraction "B" is highly reactive and has a melting temperature in the range of 150-160 degrees celcius. It will react to a full thermosetting fraction when heated to this temperature in the presence of an acid catalyst. Also included in this fraction is some vegetable oil and plant steroids (fraction "C") as well as a further yield of vanillin and syringaldehyde (fraction "A")

The alcohol soluble fraction "B" can be partitioned into pure fractions by sequential triturations of the solid form of "B" by selected solvents, after precipitation and filtration. To obtain dry material, the eluant from the alcohol extraction stage (which contains lignin, water and alcohol) is either evaporated or added to brine to precipitate the solids and collected by filtration. The lignin "B" product can then be triturated with a paraffinic liquid, typically one of the group of pentane, hexane, heptane, petroleum ether 30-60 or petroleum ether 60-80 or the like and filtered. The filtrate is concentrated by distillation to recover the solvent and the residue is lignin "C", namely the vegetable oil and other hydrocarbons such as the plant steroids. The filter cake consists of a mixture of thermoplastic lignin "D" and thermosetting lignin "E" which is now oil-free.

By triturating this filter cake with dichloromethane one can dissolve the thermoplastic lower molecular weight fraction "D". Filtration and recovery by evaporation of the dichloromethane from the filtrate yields lignin "D". The filter cake from this trituration is mainly lignin "E". But to purify lignin "E", it can be further triturated in an 80/20 alcohol/water mixture. If all of the sample dissolves, the lignin "E" is pure and is recovered by solvent removal. In some cases a residue, lignin "F" is present. Then lignin "E" is found in the filtrate after solvent recovery and the residue after filtration is lignin "F" pseudolignin. The Lignin "E" fraction increases and the lignin "D" fraction decreases in yield when the eluant "B" is stored for more than a few hours.

TABLE 1 lignin "B" and alcohol water eluant
|
concentration of eluant by RO and/or evaporation of the alcohol or precipitation in brine, followed by filtration.
|
lignin "B
|
triturate lignin "B" with paraffinic solvent
|

TABLE 1-continued

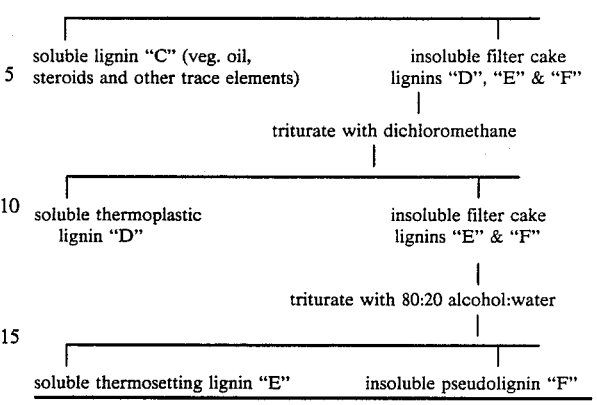

The Lignin "E" residue is the pure form thermosetting lignin. It constitutes about 30% of the original wet alcohol soluble lignin. It has a melting point of 170-180 degrees celcius and has a number average molecular weight of 1500-2000 daltons. The dichloromethane soluble Lignin "D" fraction is recovered by evaporation of the dichloromethane or precipitated by the addition of a paraffinic solvent. It is thermoplastic and it has a melting point of 130-140 degrees celcius and an average molecular weight of 800 to 1000 daltons. It constitutes about 60% of the original, wet alcohol soluble Lignin "B" fraction.

The paraffinic solvent soluble Lignin "C" fraction contains plant steriods, a vegetable oil and about 30 highly coloured plant substances some of which are lignin derivatives. The vegetable oil consists of glycerides of fatty acids (mono, di, and tri-substituted) containing an even number of carbon atoms ranging from C16 to C26. In those lignocellulosics containing Linoleic Acid as the C18 fatty acid, no saturated C18 acid is found. In aspen, Linoleic Acid Glycerides constitute more than 90% of this vegetable oil. It is the presence of this poly unsaturated material that gives aspen vegetable oil its chemical characteristics similar to linseed oil. These multiple double bonds react with atmospheric oxygen to form hydroperoxides which initiate repolymerization of the steam exploded lignin. If this type of oil is not separated from the rest of the steam exploded lignin soon after preparation, crosslinking begins to occur and the yield of reactive low molecular weight thermoplastic Lignin is reduced and the amount of thermosetting lignin increases. Solubility in dichloromethane is thereby decreased. Aspen bark contains a total of 10-20% by weight of this vegetable oil, which is rich in Linoleic Acid Triglyceride. High yields of vegetable oil are found in most bark species.

The wet alcohol insoluble but caustic soluble material, fraction "F", constitutes only a few percent of the whole dissociated lignin material. Fraction "F" is a product having an average molecular weight in excess of 1 million daltons and does not melt below 250 degrees celcius, but sinters or chars instead. This material contains Lignin crosslinks formed by condensation with furfural and related materials from hemicellulose degraded by the Explosion Process, and hence is termed a "pseudolignin".

In another embodiment of this specification, a dilute (less than two percent) caustic is used instead of alcohol, to remove the Lignin from the waterwashed, dissoci-

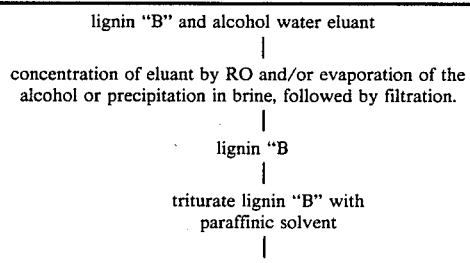

ated lignocellulosic material. The caustic used is usually one of the set: sodium hydroxide, ammonium hydroxide, potassium hydroxide. Overall yields of extract are higher than for alcohol extraction. On acidification (typically with one of the set sulfuric acid, hydrochloric acid, or Acetic Acid) to pH 3-4, the caustic Lignin is precipitated in a gel form. This gel can be collected by filtration. The residue contains salt from the caustic, necessitating a rewashing with water. After re-washing, the dark coloured granules are easily dried. Processing of the water solubles and the Lignin are performed as described above for alcohol Lignin. The time the Lignin is in the caustic and the acid influences the yield of each of the fractions. Increased thermosetting Lignin (fraction "E") yields are realized with caustic extraction and acid precipitation because of conversion of some of the thermoplastic fraction "D" Lignin to thermosetting fraction "E" Lignin.

In yet another embodiment of this specification, the caustic extracted eluant is acidified to pH 3-4 and then the mixture is heated to 40-80 degrees celcius. This results in a particulate precipitate rather than a gel. It is salt-free, brown in colour, and dries to a powder form. When dried, because of the reaction caused by the heat at low pH, the product contains little or no thermoplastic fraction "D" Lignin. This crude, very finely divided material takes a long time to dry on standing in air, and it is therefore probably best dried in a spray drier, and used as a copolymer in thermosetting plastic and resin applications.

The alcohol or caustic eluants can be fractionated into several ranges of molecular weights using reverse osmosis membranes. Alternatively, the alcohol or caustic eluants can be concentrated by removal of the alcohol and the caustic using reverse osmosis membranes until the lignin precipitates and then recover the lignin precipitate by filtration. These fractions can then be re-extracted with combinations of a paraffinic solvent, dichloromethane and alcohol to produce the "A", "C", "D", "E" and "F" fractions. The thermoplastic "D" fraction can be converted to a thermosetting "E" fraction by the use of heat in the presence of acid.

Because treatment of the thermoplastic Fraction "D" Lignin with acid converts it from thermoplastic to thermosetting Lignin, the percentage yields given above are process dependent. It was also observed that venting the gun prior to explosion as described in Canadian Patent 1,141,376, dramatically reduced the "A" fraction by over 90%. This result demonstrates that the effect of the explosion, rather than hydrolysis, clearly dominates the depolymerization of the Lignin during the Explosion Process when practiced according to Canadian Patent 1,217,765. Venting results in increased yields of the higher molecular weight thermoplastic and thermosetting fractions of the Lignin as well as a higher DP cellulose fraction.

Temperature of the lignocellulosic material and time are very important to the effectiveness of the Explosion Process. To achieve total lignin dissociation the entire subunit (eg: chips or straw) of the lignocellulosic material must achieve 234 degrees celcius temperature before the lignocellulosic material is explosively discharged to atmosphere or vented followed by explosive decompression as in Canadian Patent 1,141,376. Thermal transfer is slow in lignocellulosic material, therefore sufficient time must be allowed to ensure that the interior of the material particles reaches the desired temperature. When the reaction time is too short (for example, eleven seconds for aspen wood wafers), yields of extractable Lignin are low (5%) because most of the Lignin/hemicellulose crosslinks and the cellulose fibrils have not been sufficiently weakened by temperature to be broken by the force of the explosive decompression and abrasion. If too long a reaction time is permitted (for example, eighty seconds for aspen wood wafers), the hemicellulose exceeds its degradation temperature for too long a period and is extensively degraded to furfural which crosslinks with the Lignin to form high yields of pseudolignin. Thus, by varying the process parameters, and the use of acid in the extraction and fractionation processes, it is possible to alter the relative amounts of water soluble lignols, thermoplastic, thermosetting and pseudolignins obtained from a single source of lignocellulosic starting material.

What is claimed is:

1. A method for preparing a lignin solution by extraction of steam-exploded, dissociated lignocellulosic material and providing thermosetting and thermoplastic lignins from the lignin solution, which comprises:
   (a) extracting the steam-exploded dissociated lignocellulosic material with water at a temperature no greater than 40° C., to provide a water solution of water solubles and residual lignocellulosic material;
   (b) extracting the residual lignocellulosic material from step (a) with an extractant selected from the group consisting of an alcohol and a caustic solution to provide a solution of extracted lignins;
   (c) recovering lignins from the solution of extracted lignins;
   (d) treating lignins recovered in step (c) with a halocarbon solvent to provide a halocarbon solution of thermoplastic lignins and undissolved thermosetting lignins;
   (e) recovering thermoplastic lignins from the halocarbon solution of thermoplastic lignins of step (d);
   wherein the undissolved thermosetting lignins have a purity greater than 90 percent as measured by methoxyl content, are substantially free of carbohydrate, vegetable oil, water soluble lignin constituents and thermoplastic lignins, have a number average molecular weight in the range of 1,500-2,000 daltons and a melting point in the range of about 170° C. to 180° C.;
   and wherein the thermoplastic lignins recovered in step (e) have a purity greater than 90 percent as measured by methoxyl content, are substantially free of carbohydrate, vegetable oil, water soluble lignin constituents and thermosetting lignins, have a number average molecular weight in the range of 800-1,000 daltons and a melting point in the range of about 125° C. to 135° C.

2. A method according to claim 1 when the extractant selected in step (b) is an alcohol, in which in step (c) thereof, the lignins are recovered by precipitation from the solution of extracted lignins by addition of water to the solution of extracted lignins, or concentrating the solution of extracted lignins by removing alcohol therefrom by distillation, evaporation, or reverse osmosis.

3. A method according to claim 1 in which the lignins recovered in step (c), or the undissolved thermosetting lignins provided in step (d), or the thermoplastic lignins provided in step (e), are mixed with a paraffinic liquid to produce a mixture of a paraffinic liquid solution of lignins and residual insoluble lignins, from which mixture the residual insoluble lignins are removed and paraffinic liquid soluble lignins are recovered from the paraffinic liquid solution of lignins.

4. A method according to claim 1 when the extractant selected in step (b) is an alcohol, in which the alcohol is selected from one or more of the group consisting of ethanol, methanol and isopropanol.

5. A method according to claim 1 in which the halocarbon solvent is dichloromethane.

6. A method according to claim 1 in which step (c) is effected by precipitation of lignins followed by filtration, and step (e) is effected by evaporation.

7. A method according to claim 1 in which a solution containing water solubles left after recovery of lignins in step (c), is extracted with a halocarbon solvent to produce a halocarbon solution of water solubles, and the water solubles of the halocarbon solution of water solubles are then recovered.

8. A method according to claim 3 in which the paraffinic liquid is selected from a group consisting of pentane, hexane, heptane, petroleum ether 30–60 and petroleum ether 60–80.

9. A method according to claim 1 when the extractant selected in step (b) is a caustic solution, in which step (c) is effected by precipitation of lignins followed by filtration to produce the lignins as a residue, which residue is washed with, and then recovered from, water.

10. A method according to claim 1 when the extractant selected in step (b) is a caustic solution, wherein in step (c) thereof the lignins are precipitated from the solution of extracted lignins by either acidifying the solution of extracted lignins to provide an acidic solution with precipitated lignins, or concentrating the solution of extracted lignins by removing water therefrom by evaporation or reverse osmosis.

11. A method according to claim 10 in which the acidic solution with precipitated lignins is heated to a temperature in a range of from about 40° C. to about 80° C. until the precipitated lignins are in a particulate, as opposed to a gel, form.

12. A method according to claim 1 wherein the undissolved thermosetting lignins provided in step (d) are mixed in an alcohol water solution to provide a mixture of an alcohol water solution with dissolved lignins and undissolved pseudolignins, the undissolved pseudolignins are separated from the alcohol water solution with dissolved lignins and the dissolved lignins are recovered from the alcohol water solution with dissolved lignins.

13. A method according to claim 10 wherein the extractant selected in step (b) is a caustic solution of less than 2% by weight of caustic and the acidic solution with precipitated lignins has a pH of less than about 4.

14. A method of converting thermoplastic lignins produced in accordance with claim 1 to thermosetting lignins, which comprises heating the thermoplastic lignins to a temperature in a range of from about 40° C. to about 80° C. in an acidic solution.

15. The method of claim 14 wherein the acidic solution has a pH of less than about 4.

* * * * *